Jan. 29, 1957 P. M. MURPHY 2,779,214
ORIENTING MECHANISM
Original Filed June 11, 1946 5 Sheets-Sheet 1
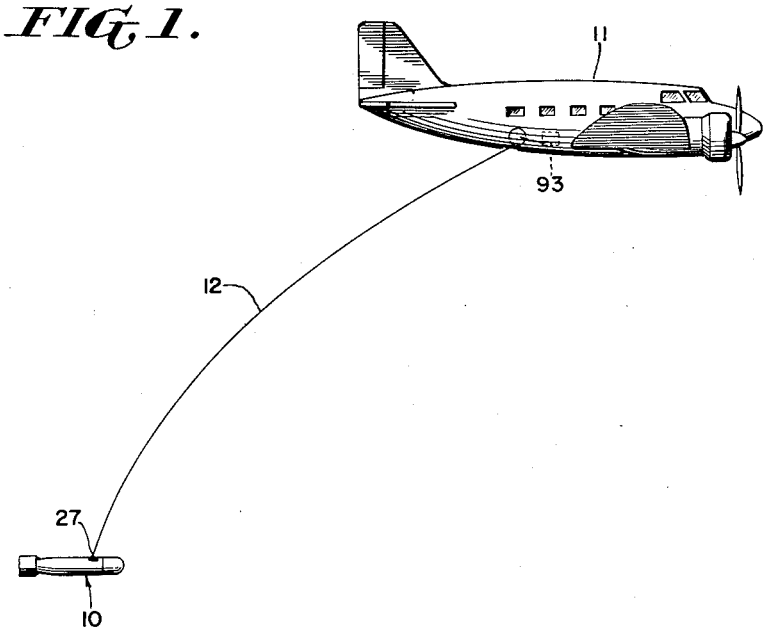
FIG. 1.
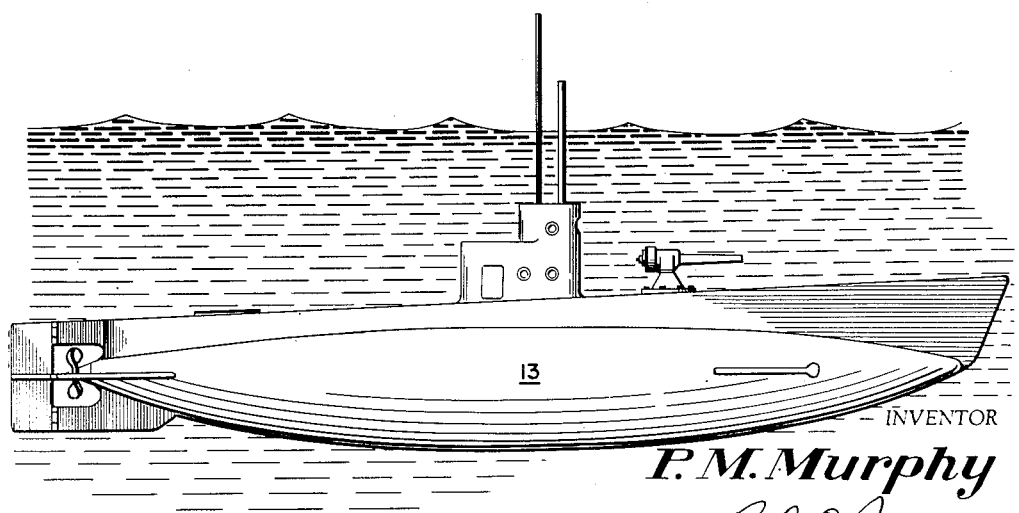
INVENTOR
P. M. Murphy
BY
ATTORNEYS Jan. 29, 1957

P. M. MURPHY 2,779,214

ORIENTING MECHANISM

Original Filed June 11, 1946

INVENTOR
*P. M. Murphy*

BY

ATTORNEYS

Jan. 29, 1957  P. M. MURPHY  2,779,214
ORIENTING MECHANISM
Original Filed June 11, 1946  5 Sheets-Sheet 3

INVENTOR
*P. M. Murphy*

BY
ATTORNEYS

Jan. 29, 1957 P. M. MURPHY 2,779,214
ORIENTING MECHANISM
Original Filed June 11, 1946 5 Sheets-Sheet 4

INVENTOR
P. M. Murphy
BY
ATTORNEYS

Jan. 29, 1957 P. M. MURPHY 2,779,214
ORIENTING MECHANISM
Original Filed June 11, 1946 5 Sheets-Sheet 5

INVENTOR
P. M. Murphy

BY
ATTORNEYS

United States Patent Office 2,779,214
Patented Jan. 29, 1957

2,779,214

ORIENTING MECHANISM

Paul M. Murphy, Richland, Wash.

Original application June 11, 1946, Serial No. 676,053, now Patent No. 2,632,884, dated March 24, 1953. Divided and this application March 18, 1953, Serial No. 343,271

3 Claims. (Cl. 74—797)

(Granted under Title 35, U. S. Code (1952), sec. 266)

This application is a division of my copending application, Serial No. 676,053, filed June 11, 1946, now Patent No. 2,632,884, dated March 24, 1953.

The present invention may be manufactured and used by or for the Government of the United States of America for governmental purposes without payment of any royalties thereon or therefor.

This invention relates generally to orienting mechanisms and more particularly to an orienting mechanism for an airborne magnetic field-sensing element adapted to maintain the element in a predetermined position with respect to an ambient field as the supporting body therefor changes position.

The device of the present invention is specially adapted for use with a magnetic airborne detector of the type disclosed and claimed in the copending application of Gerhard O. Haglund for Aerodynamic Body, Serial No. 671,341, filed May 21, 1946, now Patent No. 2,551,596.

The magnetic airborne detector, hereinafter referred to as MAD, is a recording total field magnetometer adapted to be employed in conjunction with an aircraft for the purpose of detecting magnetic anomalies caused by the presence of submarines, sunken ships, magnetic ore deposits and the like. The detector element of the MAD comprises three coils arranged with their axes mutually perpendicular. One of the coils is selected as the detector coil and is adapted to be maintained in alignment with the lines of force of the earth's magnetic field by certain control apparatus such, for example, as servo motors whose operation is initiated in response to the detection of a field by the remaining two coils.

In devices hitherto known or used for the purpose of orienting the coils, it has been usual practice to mount the coils in a gimbal support in which the detector coil is directed by rotation about two mutually perpendicular axes. The main axis of such a gimbal could be either horizontal longitudinal, horizontal transverse or vertical. In practice, however, it has been found that neither one of the above arrangements of the main axis is entirely satisfactory for all conditions of operation. The principal disadvantage arises as the detector coil approaches within substantially ten degrees of the main gimbal axis in response to movement of the towing aircraft. When this occurs, the speed of rotation required of the servo motors to align the detector coil with the lines of force of the earth's magnetic field is five times as great as that of the motion being followed. As the angle between the detector coil and the main gimbal axis decreases toward zero degrees, the speed ratio increases toward infinity such that at a certain angle, the motors are unable to align the detector coil with the lines of force and spurious signals will result.

The foregoing undesirable condition also exists when the towing aircraft maneuvers in such a way as to place the main gimbal axis within ten degrees of the magnetic dip angle of the earth's magnetic field and is usually produced by the banking or pitching of the aircraft. During maneuvers which are incident to submarine searching or geophysical surveying with the MAD, it is necessary to be able to turn about rapidly and return as quickly as possible to the target area after each pass thereover and in executing these rapid turns steep angles of bank are involved extending from forty degrees in larger planes to as high as sixty degrees in smaller planes. Therefore, the utilization of prior art devices is limited to certain latitudes and certain small angles of bank therein.

The gimbal support of the present invention obviates this disadvantage by automatically moving the main gimbal axis away from the detector coil whenever the coil tends to approach the main gimbal axis. This is accomplished by introducing into the gimbal support a third gimbal member rotatable about an axis in the same plane of and at right angles to the main gimbal axis which is selected as horizontal athwartship. The added gimbal member is coupled to the gimbal member which supports the detector coil such that rotation of the detector coil through an angle B, for example, in order to align the coil with the earth's magnetic field also causes the main gimbal axis to rotate through an angle of ½ B with respect to the coil whereby the alignment of the main gimbal axis with the coil and the consequent generation of spurious signals are avoided.

It is an object of the present invention to provide a magnetic airborne detector in which the total field coil is maintained in alignment with the lines of force of the ambient magnetic field under all conditions of operation.

Another object is to provide a new and improved orienting mechanism for an MAD and in which the main axis thereof is prevented from aligning with the total field coil.

Another object is the provision of an orienting mechanism for the detector coil of an MAD in which the detector coil is rapidly adjusted into the desired orientation thereof.

Still another object is to provide an orienting mechanism of the aforedescribed character in which the main axis thereof automatically is displaced whenever the detector coil carried thereby approaches the axis.

A still further object is the provision of an orienting mechanism in which the main axis and the detector coil thereof may be rotated at different speeds about an additional axis such that the main axis is caused to recede as the detector coil moves in the direction thereof.

Additional objects and advantages will become more clearly apparent from the following description taken in connection with the accompanying drawings of which:

Fig. 1 is a schematic view showing an application of the device of the present invention;

Fig. 2 is a vertical sectional view through the supporting body for the device of the present invention and showing the orienting mechanism in elevation;

Fig. 3 is a horizontal sectional view through the supporting body;

Figure 4:
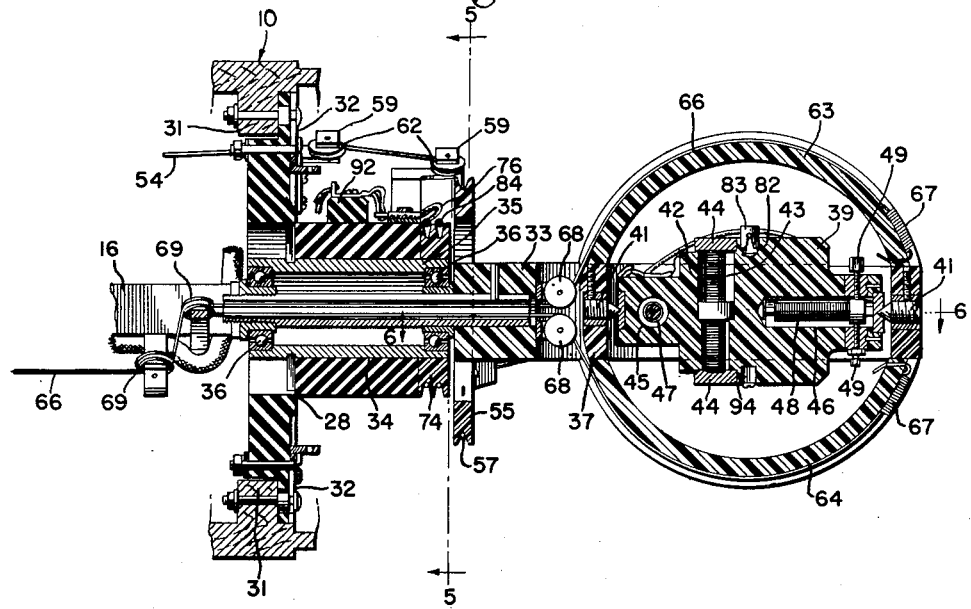
Fig. 4 is a vertical sectional view through the gimbal assembly associated with the orienting mechanism.
Figure 5:
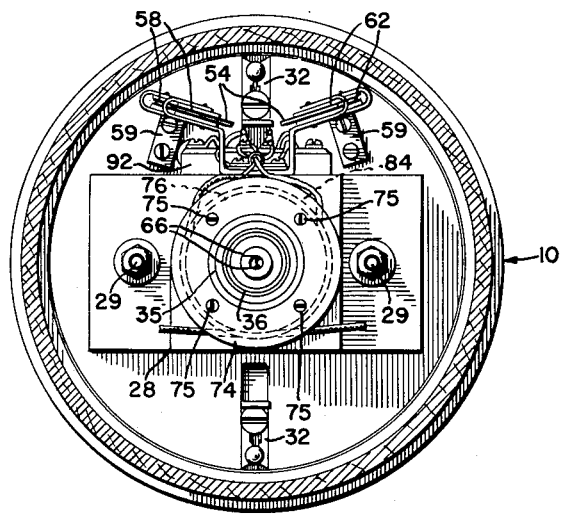
Fig. 5 is a view in section taken substantially along the line 5—5 of Fig. 4.
Figure 6:
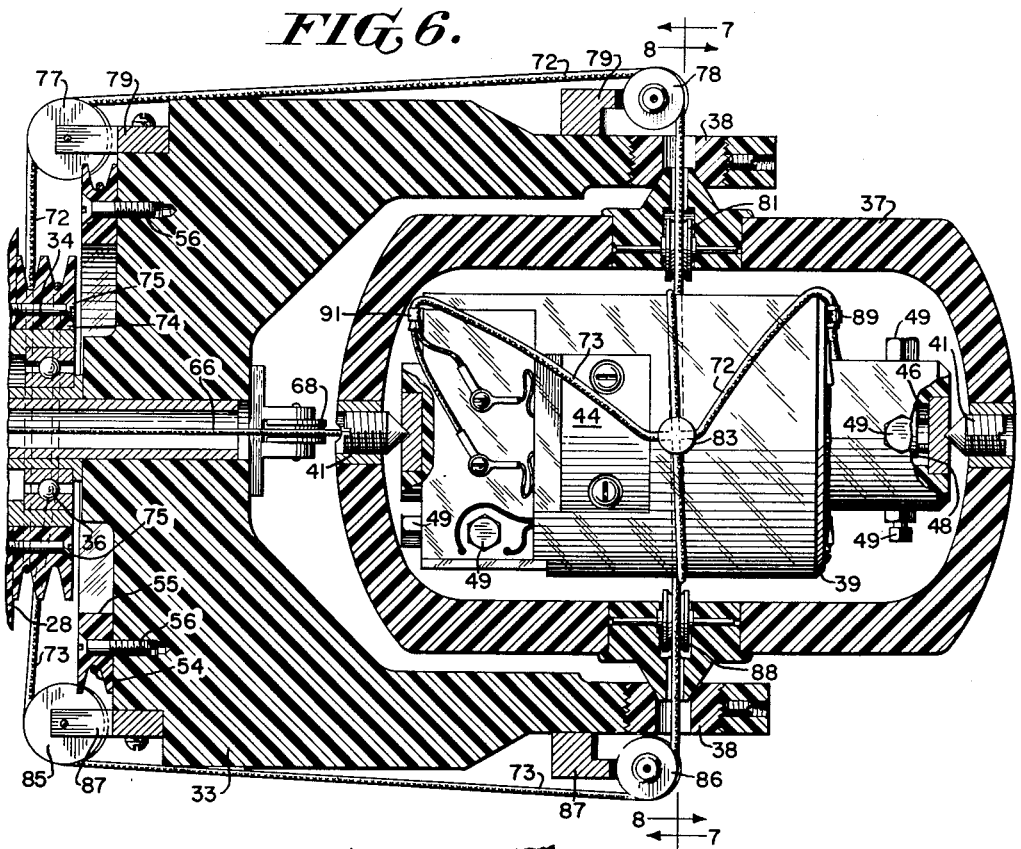
Fig. 6 is a sectional view taken substantially along the line 6—6 of Fig. 4.
Figure 7:
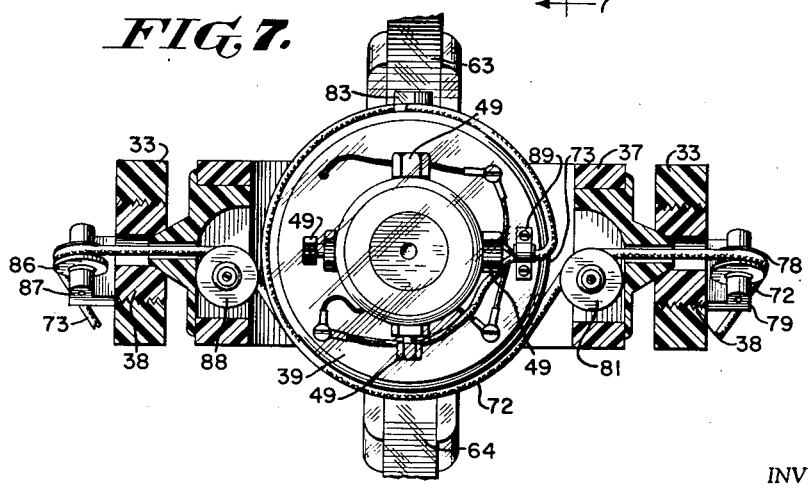
Fig. 7 is a sectional view taken substantially along the line 7—7 of Fig. 6.
Figure 8:
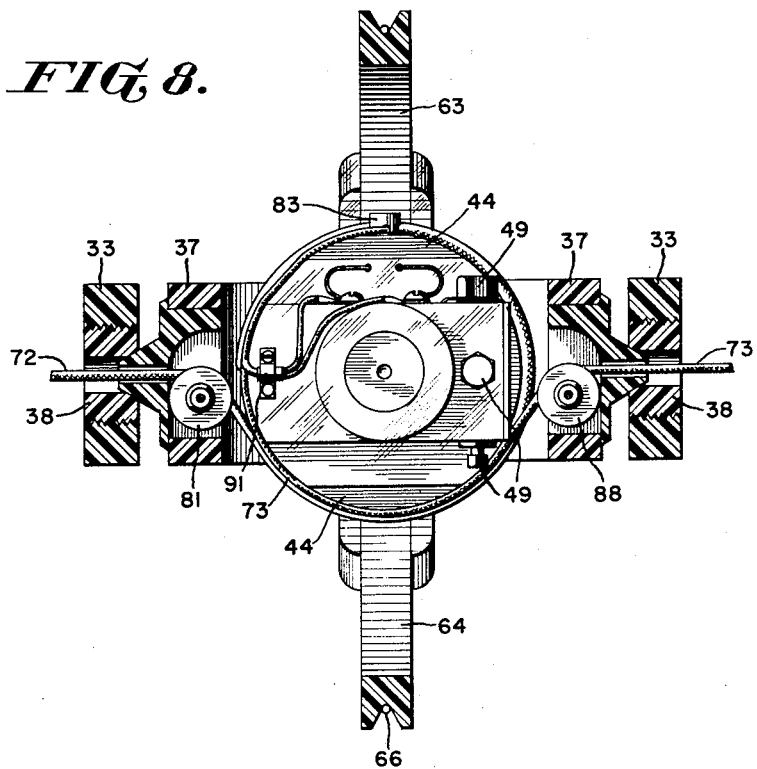
Fig. 8 is a view in section taken substantially along the line 8—8 of Fig. 6.

Referring now to the drawings wherein like characters of reference are employed to designate like parts throughout the several views, and more particularly to Fig. 1 thereof, the numeral 10 generally designates a stabilized airborne body adapted to support the detector element and orienting mechanism therefor of the magnetic airborne detector. The body or bird 10 is adapted to be suspended from and towed by a suitable aircraft 11 by means of a dual purpose cable 12 in order that the magnetic field of the towing aircraft will not influence the detector element. Fig. 1 illustrates the application of the MAD to searching and tracking of a submerged submarine 13.

The bird 10 is provided with a pair of internal grooved segments 14 and 15 by means of which a frame comprising a pair of parallel rods 16 and 17, preferably composed of aluminum, is supported within the bird, supporting pins 18 and 19 extending from rods 16 and 17 and being adapted to engage the groved segments 14 and 15 respectively. In order to maintain the rods in predetermined space relation, a ring member 21 is affixed to the rearward ends of the rods, the ring being adapted to abut against the reduced end portion of the bird 10.

A suspension gimbal assembly, indicated generally by the numeral 22 is secured to a mounting plate 23, the plate 23, in turn, being secured to the rods 16 and 17. Secured to the innermost gimbal of assembly 22 is the male portion 24 of a plug connector which is carried by cable 12 adapted to receive the female portion 25 of the connector whereby the bird and apparatus supported therein is suspended by and towed from the aircraft 11. The plug connector is of a type adapted to provide a suspension means and a means for transmitting electrical power to various electrical devices comprising the orienting mechanism of the present invention, as will appear in more detail hereinafter, and for a more complete description thereof reference is made to the copending application of E. O. Schonstedt for Anchoring Means for Strain Cored Electrical Cables, Serial No. 674,408, filed June 5, 1946, now Patent No. 2,590,131. The bird is provided with an opening 26 through which the cable 12 extends, a boot 27 being fitted around the cable and affixed to the bird in order to prevent rain, dust and the like from entering the bird.

A support 28 for the gimbal mechanism is secured to the rods 16 and 17 as by bolts 29 and is adapted to engage a shoulder 31 formed integrally on the inner periphery of the bird. Support 28 is secured to the bird by any suitable means, such, for example as snap-slide fasteners 32.

The gimbal mechanism comprises three elements, the outermost gimbal being in the form of a U-shaped member 33, rotatable about the longitudinal axis of the bird. Member 33 is rotatably suported within an opening 34 in support 28 by a hollow cantilever type bearing 35 provided with suitable ball bearings 36. The intermediate gimbal is in the form of a substantially rectangular member 37 rotatably mounted in suitable hollow bearings 38 carried by member 33. The axis of rotation of member 37, hereinafter referred to as the main gimbal axis, is disposed at right angles to the axis of rotation of member 33. The innermost gimbal is in the form of a substantially cylindrical member 39, hereinafter referred to as inductor mounting, rotatably mounted preferably in pin type bearings 41 carried by member 37. The axis of rotation of member 39 is disposed at right angles to the main gimbal axis.

Inductor mounting 39 is provided with an opening 42 therethrough in which detector coil 43 is mounted, suitable eddy current shields 44 being arranged over the ends thereof. Additional openings 45 and 46 are provided in the mounting 39 in which transverse coil 47 and axial coil 48 are arranged, respectively. Suitable adjusting screws 49 are also provided in order that coils 47 and 48 properly may be arranged within the openings individual thereto.

A drive unit, indicated generally by numeral 51, is adjustably secured to rods 16 and 17 at the rear portion thereof and comprises a transverse motor 52 and an axial motor 53. The motors preferably are of the servo type and are adjustably mounted in order that their magnetic influence on the detector coil may be reduced to a minimum. The outermost gimbal member 33 is driven about the axis of rotation thereof by means of a flexible drive cord 54 which passes around a pulley 55 secured to gimbal 33 by screws 56. Each end of cord 54 is secured to one end of a tensioning spring 57 individual thereto, the other end of the springs being anchored within a hole in pulley 55 whereby the cord is maintained in a taut condition.

From pulley 55, drive cord 54 passes through a pair of guide rollers 58 supported by brackets 59 secured to support 28, from whence the cord extends through an opening in support 28 to capstan 61 associated with the transverse motor 52. The cord is looped around the capstan and is returned to pulley 55 through another opening in support 28 and over two additional guide rollers 62 supported in a manner similar to that of rollers 58.

The intermediate gimbal 37 is provided with two grooved segments 63 and 64 secured thereto as by screws 65 and which are adapted to receive a flexible drive cord 66 by means of which the gimbal 37 is actuated. The ends of cord 66 are respectively secured to tensioning springs 67, the springs, in turn, being anchored in the segments 63 and 64. Cord 66 extends from the segments over idler pulleys 68 secured to gimbal 33 and adapted to direct the cord through the hollow bearing 35 about which gimbal 33 rotates, thereby preventing the rotation of gimbal 33 from interfering with the rotation of gimbal 37. Cord 66 continues over additional idler pulleys 69 adapted to guide the cord in such a manner that it properly will pass over capstan 71 of axial motor 53, idler pulleys 69 being secured to rods 16 and 17 in any suitable manner.

The innermost gimbal member or inductor mounting 39 is rotated by means of cords 72 and 73 which extend from a double grooved pulley 74 rigidly secured to support 28 by screws 75. Pulley 74 is of the same diameter as the inductor mounting and is arranged on support 28 coaxially with the axis of rotation of gimbal 33. One end of cord 72 is secured to a tensioning spring 76 which, in turn, is anchored within one groove of pulley 74. From spring 76, cord 72 extends over idler pulleys 77 and 78, supported on brackets 79 secured to gimbal 33, from whence it passes through the hollow bearings 38 carried by gimbal 33 and over an additional idler pulley 81 rotatably supported within gimbal 37. The mounting 39 is provided with an opening 82 adapted to receive a plug 83 whose function is to pin cord 72 within the opening, the cord passing from pulley 81 around the under portion of mounting 39 to opening 82.

Similarly, one end of cord 73 is secured to a tensioning spring 84 which, in turn, is anchored within the other groove of pulley 74. From pulley 74, cord 73 extends as follows: over idler pulleys 85 and 86 supported on brackets 87 secured to gimbal 33, through the other hollow bearing 38 on gimbal 33, over an additional idler pulley 88 rotatably supported within gimbal 37, from whence the cord passes around the under portion of mounting 39 to the opening 82 therein where it is pinned by plug 83. Cord 72 continues from opening 82 forwardly across gimbal 39 and is secured thereto by clamp 89, cord 73 also extending from the opening rearwardly across gimbal 39 and being secured thereto by a clamp 91.

Cords 72 and 73 preferably are of the tinsel conductor type whereby electrical connection to the coils 43, 47 and 48 is effected, cords 72 having three conductors disposed therein and cord 73 having two conductors disposed therein. Each conductor is terminated at a terminal block 92 located on support 28. Suitable cables extend from the terminal block and together with the cables extending from motors 52 and 53 are secured to the male portion 24 of the plug connector hereinbefore described.

As heretofore described, the main detector coil is adapted to be maintained in alignment with the direction of the lines of force of the earth's magnetic field such that the transverse and axial coils are disposed at right angles to the direction of these lines of force. Both the transverse and axial coils are excited with a voltage of predetermined frequency supplied from a suitable alternating current source comprising the control apparatus of the MAD, indicated generally by numeral 93 and located in the aircraft 11. As either of these coils forms an angle of less than ninety degrees with the lines of force of the earth's field, there will be induced therein a second harmonic voltage of a magnitude and phase depending upon the magnitude and direction of the angular displacement of the coil. The second harmonic voltages are transmitted through cable 12 to control apparatus 93, wherein the voltages are converted in frequency and the converted voltages are thereafter applied to the driving motors associated with the coils.

Displacement of the transverse coil 47 initiates the operation of transverse motor 52 to rotate the outer gimbal 33 in either direction to correct for the displacement. The foregoing arrangement of cords 72 and 73, it will be noted, has the same effect as an endless cord passing over pulley 74 and around the inner gimbal 39 thereby coupling together the outer and inner gimbals such that the rotation of gimbal 33 about its axis of rotation causes the inner gimbal to rotate in the same direction as, and through twice the rotational angle of, the outer gimbal. Such an arrangement prevents the main detector coil from approaching within ten degrees of the main gimbal axis and, hence, from aligning with the main gimbal axis. By way of example, let it be assumed that the aircraft 11 is in level flight at the equator. Under this condition, an angle of forty-five degrees exists between the main detector coil and the main gimbal axis. If, then, the aircraft executed a forty-five degree bank, the angular difference between the main detector coil and the main gimbal axis would be twenty-two and one-half degrees, well beyond the critical ten degree region.

Figure 9:
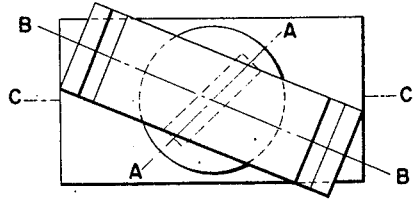
Figs. 9 and 10 illustrate diagrammatically the relative motion between the gimbals comprising the gimbal assembly.
Figure 10:
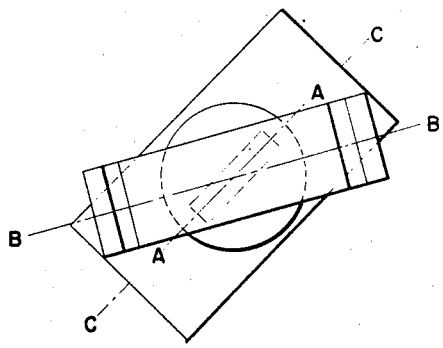

Fig. 9 illustrates the relative positions of the gimbals while the aircraft is in level flight at the equator, A—A representing the axis of the main detector coil, B—B the main gimbal axis, and C—C the horizontal athwartship axis of support 28. Fig. 10 illustrates the relative positions of the gimbals while the aircraft executes the forty-five degree bank of the aforementioned example. From an inspection of these views, it can be seen that if the outer gimbal is rotated through an angle, for example, with respect to support 28, the inner gimbal 39 is caused to rotate through an angle of with respect to the outer gimbal, or through an angle of 2 with respect to support 28.

Displacement of the axial coil 48 initiates the operation of the axial motor 53 to rotate the intermediate gimbal 37 in either direction to correct for the displacement.

It is well known that the direction of the lines of force of the earth's magnetic field in the southern hemisphere is opposite to those in the northern hemisphere. Therefore, it is necessary that some provision be made to place the inner gimbal in either one of two positions, depending upon the hemisphere in which the device is to be employed. For this purpose an additional opening 94 is provided in the inner gimbal diametrically opposite opening 82 and to make the change plug 83 is removed from hole 82, the inner gimbal is rotated 180 degrees and the drive cords 72 and 73 are pinned in opening 94. Also, the driving cord 66 is crossed in order to compensate for the fact that the voltage generated by the axial coil in the southern hemisphere is opposite in direction from that generated thereby in the northern hemisphere.

It will be noted that, with the exception of support 28 which preferably is composed of fibre block, the gimbal assembly of the present orienting mechanism is constructed chiefly of Lucite to avoid the use of metals and at the same time avoid dimensional changes resulting from humidity changes.

From the foregoing, it should now be apparent that an orienting mechanism has been provided which is well adapted to fulfill the aforesaid objects of the invention.

While the invention has been disclosed in particularity with reference to an example thereof which gives satisfactory results, it readily will be apparent to those skilled in the art to which the invention appertains, after understanding the invention, that further changes, modifications and embodiments may be made without departing from the spirit and scope of the invention as defined by the claims appended hereto.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. An orienting mechanism of the character disclosed comprising, in combination, a support, a pair of gimbal members supported one within the other and rotatable about mutually perpendicular axes, means securing the outermost gimbal member to said support for rotation with respect thereto, an element carried by the innermost member and rotatable about an axis perpendicular to the axis of rotation of the innermost member, and means for coupling the outermost member to said element in such manner that the element is caused to rotate through an angle twice that traversed by the outermost member as rotation thereof is produced, said coupling means including a pair of flexible cable members having one of their respective ends attached to said element and the other of their respective ends connected to said support, means for guiding said cables from said support to said element, said cable being looped about said element for rotating said element selectively in opposite directions, and means for maintaining said cables taut.

2. A mechanism according to claim 1 in which the means for maintaining said cables taut comprises a pair of helical spring elements interconnecting said other ends of said cable and said support.

3. A mechanism according to claim 1 in which said gimbal members have a pair of hollow pivotal interconnections, through each of which a different one of said cables is movably disposed.

References Cited in the file of this patent
UNITED STATES PATENTS 2,441,157    Kissel                  May 11, 1948
2,492,992    Handel                Jan. 3, 1950